(12) United States Patent
Kim

(10) Patent No.: US 7,860,087 B2
(45) Date of Patent: Dec. 28, 2010

(54) DISTINGUISHING BETWEEN PROTOCOL PACKETS IN A WIRELESS COMMUNICATION SYSTEM

(75) Inventor: Myeong-Cheol Kim, Aachen (DE)

(73) Assignee: LG Electronics Inc., Seoul (KR)

( * ) Notice: Subject to any disclaimer, the term of this patent is extended or adjusted under 35 U.S.C. 154(b) by 1061 days.

(21) Appl. No.: 11/198,702

(22) Filed: Aug. 5, 2005

(65) Prior Publication Data

US 2006/0050705 A1  Mar. 9, 2006

Related U.S. Application Data

(60) Provisional application No. 60/599,590, filed on Aug. 5, 2004, provisional application No. 60/601,267, filed on Aug. 12, 2004.

(51) Int. Cl.
*H04L 12/28* (2006.01)
*H04L 12/56* (2006.01)

(52) U.S. Cl. .................. 370/389; 370/216; 370/248

(58) Field of Classification Search ............... 370/254, 370/389
See application file for complete search history.

(56) References Cited

U.S. PATENT DOCUMENTS

| | | | |
|---|---|---|---|
| 6,449,491 | B1 | 9/2002 | Dailey |
| 7,200,670 | B1* | 4/2007 | Hearn et al. ............ 709/232 |
| 7,602,802 | B2 | 10/2009 | Kim |
| 2001/0022785 | A1* | 9/2001 | Pessi .................. 370/352 |
| 2002/0085506 | A1* | 7/2002 | Hundscheidt et al. ...... 370/254 |
| 2002/0111166 | A1 | 8/2002 | Monroe |
| 2003/0156578 | A1* | 8/2003 | Bergenlid et al. ........ 370/352 |
| 2005/0195852 | A1 | 9/2005 | Vayanos et al. |
| 2006/0019641 | A1 | 1/2006 | Vayanos et al. |
| 2006/0030342 | A1 | 2/2006 | Hwang et al. |
| 2006/0268873 | A1 | 11/2006 | Tonjes et al. |
| 2008/0070584 | A1 | 3/2008 | Kuo |
| 2008/0112352 | A1 | 5/2008 | Kuo |

(Continued)

FOREIGN PATENT DOCUMENTS

EP  1 113 644 A2  7/2001

(Continued)

OTHER PUBLICATIONS

IETF, Network Working Group, Request for Comments 3550, Standards Track, H. Schulzrinne et al, Jul. 2003.*

(Continued)

*Primary Examiner*—Daniel Wu
*Assistant Examiner*—Frederick Ott
(74) *Attorney, Agent, or Firm*—Lee, Hong, Degerman, Kang & Waimey

(57) ABSTRACT

The present invention is directed to distinguishing between protocol packets in a wireless communication system. A transmitting side receives an IP packet comprising a User Datagram Protocol (UDP) header and a second header located after the UDP header. The second header is related to either an RTP packet or an RTCP packet. By checking the second header for a payload type field value, the transmitting side can determine whether the second header is related to the RTP packet or the RTCP packet based on the payload type field value. Afterward, the transmitting side assigns a different quality of service for each of at least one of the RTP packet and the RTCP packet according to the determination.

28 Claims, 11 Drawing Sheets

U.S. PATENT DOCUMENTS

2008/0112367 A1 5/2008 Kuo
2008/0113662 A1 5/2008 Kuo

FOREIGN PATENT DOCUMENTS

| JP | 2002-171548 A | 6/2002 |
| JP | 2004-297775 A | 10/2004 |
| JP | 2007-533246 A | 11/2007 |
| KR | 2005-6952 A | 1/2005 |
| WO | 03/030451 A1 | 4/2003 |
| WO | WO 2004/030433 A2 | 4/2004 |
| WO | WO 2005/065060 A2 | 7/2005 |

OTHER PUBLICATIONS

IETF, Network Working Group, Request for Comments 3550, Standards Track, H. Schulzrinne et al., Jul. 2003.*

"Proposed way forward on MBMS introduction in RRC" 3GPP TSG-RAN2 Meeting #42-bis, Cannes, France, Jun. 21-24, 2004, Tdoc R2-041329, Samsung.

"Timing of MCCH Information" TSG-RAN Working Group 2 #44, Sophia Antipolis, France, Oct. 4-8, R2-041944, LG Electronics, 2004.

* cited by examiner

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

FIG. 9

```
                 0                   1                   2                   3
                 0 1 2 3 4 5 6 7 8 9 0 1 2 3 4 5 6 7 8 9 0 1 2 3 4 5 6 7 8 9 0 1
                +-+-+-+-+-+-+-+-+-+-+-+-+-+-+-+-+-+-+-+-+-+-+-+-+-+-+-+-+-+-+-+-+
header  |V=2|P|    RC   |   PT=SR=200   |             length            |
                +-+-+-+-+-+-+-+-+-+-+-+-+-+-+-+-+-+-+-+-+-+-+-+-+-+-+-+-+-+-+-+-+
                |                         SSRC of sender                        |
                +=+=+=+=+=+=+=+=+=+=+=+=+=+=+=+=+=+=+=+=+=+=+=+=+=+=+=+=+=+=+=+=+
sender  |              NTP timestamp, most significant word             |
info            +-+-+-+-+-+-+-+-+-+-+-+-+-+-+-+-+-+-+-+-+-+-+-+-+-+-+-+-+-+-+-+-+
                |             NTP timestamp, least significant word             |
                +-+-+-+-+-+-+-+-+-+-+-+-+-+-+-+-+-+-+-+-+-+-+-+-+-+-+-+-+-+-+-+-+
                |                         RTP timestamp                         |
                +-+-+-+-+-+-+-+-+-+-+-+-+-+-+-+-+-+-+-+-+-+-+-+-+-+-+-+-+-+-+-+-+
                |                     sender's packet count                     |
                +-+-+-+-+-+-+-+-+-+-+-+-+-+-+-+-+-+-+-+-+-+-+-+-+-+-+-+-+-+-+-+-+
                |                      sender's octet count                     |
                +=+=+=+=+=+=+=+=+=+=+=+=+=+=+=+=+=+=+=+=+=+=+=+=+=+=+=+=+=+=+=+=+
report  |                 SSRC_1 (SSRC of first source)                 |
block           +-+-+-+-+-+-+-+-+-+-+-+-+-+-+-+-+-+-+-+-+-+-+-+-+-+-+-+-+-+-+-+-+
  1     | fraction lost |       cumulative number of packets lost       |
                +-+-+-+-+-+-+-+-+-+-+-+-+-+-+-+-+-+-+-+-+-+-+-+-+-+-+-+-+-+-+-+-+
                |           extended highest sequence number received           |
                +-+-+-+-+-+-+-+-+-+-+-+-+-+-+-+-+-+-+-+-+-+-+-+-+-+-+-+-+-+-+-+-+
                |                       interarrival jitter                     |
                +-+-+-+-+-+-+-+-+-+-+-+-+-+-+-+-+-+-+-+-+-+-+-+-+-+-+-+-+-+-+-+-+
                |                         last SR (LSR)                         |
                +-+-+-+-+-+-+-+-+-+-+-+-+-+-+-+-+-+-+-+-+-+-+-+-+-+-+-+-+-+-+-+-+
                |                    delay since last SR (DLSR)                 |
                +=+=+=+=+=+=+=+=+=+=+=+=+=+=+=+=+=+=+=+=+=+=+=+=+=+=+=+=+=+=+=+=+
report  |                 SSRC_2 (SSRC of second source)                |
block           +-+-+-+-+-+-+-+-+-+-+-+-+-+-+-+-+-+-+-+-+-+-+-+-+-+-+-+-+-+-+-+-+
  2     :                               ...                             :
                +=+=+=+=+=+=+=+=+=+=+=+=+=+=+=+=+=+=+=+=+=+=+=+=+=+=+=+=+=+=+=+=+
                |                      profile-specific extensions              |
                +-+-+-+-+-+-+-+-+-+-+-+-+-+-+-+-+-+-+-+-+-+-+-+-+-+-+-+-+-+-+-+-+
```

FIG. 10

```
            0                   1                   2                   3
            0 1 2 3 4 5 6 7 8 9 0 1 2 3 4 5 6 7 8 9 0 1 2 3 4 5 6 7 8 9 0 1
           +-+-+-+-+-+-+-+-+-+-+-+-+-+-+-+-+-+-+-+-+-+-+-+-+-+-+-+-+-+-+-+-+
 header    |V=2|P|    RC   |   PT=RR=201   |             length            |
           +-+-+-+-+-+-+-+-+-+-+-+-+-+-+-+-+-+-+-+-+-+-+-+-+-+-+-+-+-+-+-+-+
           |                     SSRC of packet sender                     |
           +=+=+=+=+=+=+=+=+=+=+=+=+=+=+=+=+=+=+=+=+=+=+=+=+=+=+=+=+=+=+=+=+
 report    |                 SSRC_1 (SSRC of first source)                 |
 block     +-+-+-+-+-+-+-+-+-+-+-+-+-+-+-+-+-+-+-+-+-+-+-+-+-+-+-+-+-+-+-+-+
    1      | fraction lost |       cumulative number of packets lost       |
           +-+-+-+-+-+-+-+-+-+-+-+-+-+-+-+-+-+-+-+-+-+-+-+-+-+-+-+-+-+-+-+-+
           |           extended highest sequence number received           |
           +-+-+-+-+-+-+-+-+-+-+-+-+-+-+-+-+-+-+-+-+-+-+-+-+-+-+-+-+-+-+-+-+
           |                      interarrival jitter                      |
           +-+-+-+-+-+-+-+-+-+-+-+-+-+-+-+-+-+-+-+-+-+-+-+-+-+-+-+-+-+-+-+-+
           |                         last SR (LSR)                         |
           +-+-+-+-+-+-+-+-+-+-+-+-+-+-+-+-+-+-+-+-+-+-+-+-+-+-+-+-+-+-+-+-+
           |                   delay since last SR (DLSR)                  |
           +=+=+=+=+=+=+=+=+=+=+=+=+=+=+=+=+=+=+=+=+=+=+=+=+=+=+=+=+=+=+=+=+
 report    |                 SSRC_2 (SSRC of second source)                |
 block     +-+-+-+-+-+-+-+-+-+-+-+-+-+-+-+-+-+-+-+-+-+-+-+-+-+-+-+-+-+-+-+-+
    2      :                              ...                              :
           +=+=+=+=+=+=+=+=+=+=+=+=+=+=+=+=+=+=+=+=+=+=+=+=+=+=+=+=+=+=+=+=+
           |                      profile-specific extensions              |
           +-+-+-+-+-+-+-+-+-+-+-+-+-+-+-+-+-+-+-+-+-+-+-+-+-+-+-+-+-+-+-+-+
```

DISTINGUISHING BETWEEN PROTOCOL PACKETS IN A WIRELESS COMMUNICATION SYSTEM

CROSS-REFERENCE TO RELATED APPLICATIONS

Pursuant to 35 U.S.C. §119(e), this application claims the benefit of earlier filing date and right of priority to U.S. Provisional Application No. 60/599,590, filed on Aug. 5, 2004 and U.S. Provisional Application No. 60/601,267, filed on Aug. 12, 2004, the contents of which are hereby incorporated by reference herein in their entirety.

FIELD OF THE INVENTION

The present invention relates to transmitting and receiving protocol packets, and more particularly, to distinguishing between protocol packets in a wireless communication system.

BACKGROUND OF THE INVENTION

Recently, mobile communication systems have developed remarkably, but for high capacity data communication services, the performance of mobile communication systems cannot match that of existing wired communication systems. Accordingly, technical developments for IMT-2000, which is a communication system allowing high capacity data communications, are being made and standardization of such technology is being actively pursued among various companies and organizations.

A universal mobile telecommunication system (UMTS) is a third generation mobile communication system that has evolved from a European standard known as Global System for Mobile communications (GSM). The UMTS aims to provide improved mobile communication service based on a GSM core network and wideband code division multiple access (W-CDMA) wireless connection technology.

In December 1998, ETSI of Europe, ARIB/TTC of Japan, T1 of the United States, and TTA of Korea formed a Third Generation Partnership Project (3GPP) for creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a mobile terminal (or user equipment: UE) 10, a UTRAN 100, and a core network (CN) 200.

The UTRAN 100 includes one or more radio network sub-systems (RNS) 110, 120. Each RNS 110, 120 includes a radio network controller (RNC) 111, and a plurality of base stations or Node-Bs 112, 113 managed by the RNC 111. The RNC 111 handles the assigning and managing of radio resources, and operates as an access point with respect to the core network 200.

The Node-Bs 112, 113 receive information sent by the physical layer of the terminal through an uplink, and transmit data to the terminal through a downlink. The Node-Bs 112, 113, thus, operate as access points of the UTRAN 100 for the terminal.

A primary function of the UTRAN 100 is forming and maintaining a radio access bearer (RAB) to allow communication between the terminal and the core network 200. The core network 200 applies end-to-end quality of service (QoS) requirements to the RAB, and the RAB supports the QoS requirements set by the core network 200. As the UTRAN 100 forms and maintains the RAB, the QoS requirements of end-to-end are satisfied. The RAB service can be further divided into an Iu bearer service and a radio bearer service. The Iu bearer service supports a reliable transmission of user data between boundary nodes of the UTRAN 100 and the core network 200.

The core network 200 includes a mobile switching center (MSC) 210 and a gateway mobile switching center (GMSC) 220 connected together for supporting a circuit switched (CS) service, and a serving GPRS support node (SGSN) 230 and a gateway GPRS support node 240 connected together for supporting a packet switched (PS) service.

The services provided to a specific terminal are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 111 are connected to the MSC 210 of the core network 200, and the MSC 210 is connected to the GMSC 220 that manages the connection with other networks.

For supporting packet switched services, the RNCs 111 are connected to the SGSN 230 and the GGSN 240 of the core network 200. The SGSN 230 supports the packet communications going toward the RNCs 111, and the GGSN 240 manages the connection with other packet switched networks, such as the Internet.

Various types of interfaces exist between network components to allow the network components to transmit and receive information to and from each other for mutual communication therebetween. An interface between the RNC 111 and the core network 200 is defined as an Iu interface. In particular, the Iu interface between the RNCs 111 and the core network 200 for packet switched systems is defined as "Iu-PS," and the Iu interface between the RNCs 111 and the core network 200 for circuit switched systems is defined as "Iu-CS."

FIG. 2 illustrates a structure of a radio interface protocol between the terminal and the UTRAN according to the 3GPP radio access network standards.

As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information of the user, such as voice or Internet protocol (IP) packets, while the control plane is a region that handles control information for an interface of a network, maintenance and management of a call, and the like.

The protocol layers in FIG. 2 can be divided into a first layer (L1), a second layer (L2), and a third layer (L3) based on three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH) and a paging control channel (PCCH) or a Shared Channel Control Channel (SHCCH). The BCCH provides information including information utilized by a terminal to access a system. The PCCH is used by the UTRAN to access a terminal.

A Multimedia Broadcast/Multicast Service (MBMS or "MBMS service") refers to a method of providing streaming or background services to a plurality of UEs using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs within a broadcast area, for example the domain where the broadcast is available. The multicast mode is for transmitting multimedia data to a specific UE group within a multicast area, for example the domain where the multicast service is available.

For purposes of MBMS, additional traffic and control channels exist. For example, an MCCH (MBMS point-to-multipoint Control Channel) is used for transmitting MBMS control information while an MTCH (MBMS point-to-multipoint Traffic Channel) is used for transmitting MBMS service data.

The different logical channels that exist are listed below:

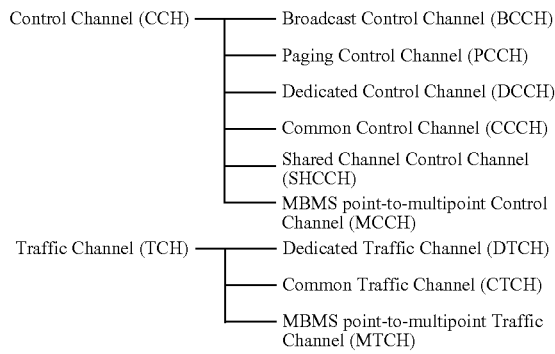

The MAC layer is connected to the physical layer by transport channels and can be divided into a MAC-b sub-layer, a MAC-d sub-layer, a MAC-c/sh sub-layer, and a MAC-hs sub-layer according to the type of transport channel to be managed.

The MAC-b sub-layer manages a BCH (Broadcast Channel), which is a transport channel handling the broadcasting of system information. The MAC-d sub-layer manages a dedicated channel (DCH), which is a dedicated transport channel for a specific terminal. Accordingly, the MAC-d sub-layer of the UTRAN is located in a serving radio network controller (SRNC) that manages a corresponding terminal, and one MAC-d sub-layer also exists within each terminal (UE).

The MAC-c/sh sub-layer manages a common transport channel, such as a forward access channel (FACH) or a downlink shared channel (DSCH), which is shared by a plurality of terminals, or in the uplink the Radio Access Channel (RACH). In the UTRAN, the MAC-c/sh sub-layer is located in a controlling radio network controller (CRNC). As the MAC-c/sh sub-layer manages the channel being shared by all terminals within a cell region, a single MAC-c/sh sub-layer exists for each cell region. Also, one MAC-c/sh sublayer exists in each terminal (UE). Referring to FIG. 3, possible mapping between the logical channels and the transport channels from a UE perspective is shown. Referring to FIG. 4, possible mapping between the logical channels and the transport channels from a UTRAN perspective is shown.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The BMC layer schedules a cell broadcast message (referred to as a 'CB message', hereinafter) received from the core network, and broadcasts the CB messages to terminals located in a specific cell(s). The BMC layer of the UTRAN generates a broadcast/multicast control (BMC) message by adding information, such as a message ID (identification), a serial number, and a coding scheme to the CB message received from the upper layer, and transfers the BMC message to the RLC layer. The BMC messages are transferred from the RLC layer to the MAC layer through a logical channel, i.e., the CTCH (Common Traffic Channel). The CTCH is mapped to a transport channel, i.e., a FACH, which is mapped to a physical channel, i.e., a S-CCPCH (Secondary Common Control Physical Channel).

The PDCP (Packet Data Convergence Protocol) layer, as a higher layer of the RLC layer, allows the data transmitted through a network protocol, such as an IPv4 or IPv6, to be effectively transmitted on a radio interface with a relatively small bandwidth. To achieve this, the PDCP layer reduces unnecessary control information used in a wired network, a function called header compression.

A radio resource control (RRC) layer is located at a lowermost portion of the L3 layer. The RRC layer is defined only in the control plane, and handles the control of logical channels, transport channels, and physical channels with respect to setup, reconfiguration, and release or cancellation of radio bearers (RBs). The radio bearer service refers to a service provided by the second layer (L2) for data transmission between the terminal and the UTRAN. In general, the setup of the radio bearer refers to the process of defining the characteristics of a protocol layer and a channel required for providing a specific data service, as well as respectively setting detailed parameters and operation methods.

The RLC layer can belong to the user plane or to the control plane depending upon the type of layer connected at the upper layer of the RLC layer. That is, if the RLC layer receives data from the RRC layer, the RLC layer belongs to the control plane. Otherwise, the RLC layer belongs to the user plane.

The different possibilities that exist for the mapping between the radio bearers and the transport channels are not always possible. The UE/UTRAN deduces the possible mapping depending on the UE state and the procedure that the UE/UTRAN is executing. The different states and modes are explained in more detail below.

The different transport channels are mapped onto different physical channels. For example, the RACH transport channel is mapped on a given PRACH, the DCH can be mapped on the DPCH, the FACH and the PCH can be mapped on the S-CCPCH, the DSCH is mapped on the PDSCH and so on. The configuration of the physical channels is given by an RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network. Specifically, the core network can only detect the existence of idle mode terminals within a region that is larger than a cell, such as a location or a routing area. Therefore, the existence of idle mode terminals is determined within large regions. In order to receive mobile communication services such as voice or data, the idle mode terminal must move or change into the RRC connected mode. The possible transitions between modes and states are shown in FIG. 5.

A UE in RRC connected mode can be in different states, such as a CELL_FACH state, a CELL_PCH state, a CELL_DCH state or a URA_PCH state. Depending on the states, the UE listens to different channels. For example a UE in CELL_DCH state will try to listen (amongst others) to DCH type of transport channels, which comprises DTCH and DCCH transport channels, and which can be mapped to a certain DPCH. The UE in CELL_FACH state will listen to several FACH transport channels which are mapped to a certain S-CCPCH physical channel. The UE in PCH state will listen to the PICH channel and to the PCH channel, which is mapped to a certain S-CCPCH physical channel.

The UE also carries out different actions depending on the state. For example, based on different conditions, a UE in CELL_FACH will start a CELL Update procedure each time the UE changes from the coverage of one cell into the coverage of another cell. The UE starts the CELL Update procedure by sending to the NodeB a Cell Update message to indicate that the UE has changed its location. The UE will then start listening to the FACH. This procedure is additionally used when the UE comes from any other state to CELL_FACH state and the UE has no C-RNTI available, such as when the UE comes from the CELL_PCH state or CELL_DCH state, or when the UE in CELL_FACH state was out of coverage.

In the CELL_DCH state, the UE is granted dedicated radio resources, and may additionally use shared radio resources. This allows the UE to have a high data rate and efficient data exchange. However, the radio resources are limited. It is the responsibility of the UTRAN to allocate the radio resources amongst the UEs such that they are efficiently used and ensure that the different UEs obtain the quality of service required.

A UE in CELL_FACH state has no dedicated radio resources attributed, and can only communicate with the UTRAN via shared channels. Thus, the UE consumes few radio resources. However, the data rate available is very limited. Also, the UE needs to permanently monitor the shared channels. Thus, UE battery consumption is increased in the case where the UE is not transmitting.

A UE in CELL_PCH/URA_PCH state only monitors the paging channel at dedicated occasions, and therefore minimizes the battery consumption. However, if the network wishes to access the UE, it must first indicate this desire on the paging occasion. The network may then access the UE, but only if the UE has replied to the paging. Furthermore, the UE can only access the network after performing a Cell Update procedure which introduces additional delays when the UE wants to send data to the UTRAN.

Currently, via the Internet, two terminals (e. g. two PCs) can communicate voice, video and data not only via a strict a wireline network, but also through a telecommunication system wherein at least part of the communication path is wireless. Such a telecommunication system includes a radio access network (RAN), such as the RAN providing access to the UMTS (Universal Mobile Telecommunications System) being developed under the auspices of 3GPP (Third Generation Partnership Program). To enable such multimedia (MM) communication between two terminals, the UMTS includes a component referred to as IMS (Internet Protocol Multimedia Subsystem).

The 3GPP system (UMTS) in its first release (R99) was designed to be backward compatible with the existing GSM (Global System for Mobile Communications) circuit switched infrastructure. Because the costs to procure and maintain the very proprietary hardware of circuit switched systems are very high and because much of the bandwidth used to transmit user data is lost, the 3GPP system is slowly evolving toward an all-IP core network. Thus, the existing circuit switched infrastructure will ultimately be outdated and replaced by IP-based hardware, which is open, scalable, and cheaper to procure and maintain due to a more competitive market. Therefore, through REL-4 and REL-5 of the 3GPP specifications, more and more importance is given to IP-based architecture. The IMS is introduced first to handle classical circuit switched services, such as voice over IP (VoIP), and second to handle all multimedia services provided to subscribers.

Referring to FIG. 6, the IMS (IP Multimedia Subsystem) is an extension of the PS (packet-switched) Core Network (CN) of UMTS. It uses a Session Initiation Protocol (SIP) to set up, maintain and terminate voice and multimedia sessions.

An example of a session is a series of communications in which a user is first engaged in a voice communication, and then receives an incoming IP video communication but decides not to accept the IP video communication. Instead, the user diverts the incoming video to a messaging system, which then posts in the user's mail box a message indicating that the user has new mail, i.e. the video message.

SIP is a part of the overall Internet Engineering Task Force (IETF) multimedia data and control architecture. It is used in conjunction with other IETF protocols, such as a Session Description Protocol (SDP) and a Real-Time Protocol (RTP). SIP is a signaling protocol for handling the setup, modification, and teardown of MM sessions, and in combination with the protocols with which it is used, describes the session characteristics of a communication session to potential session participants. Usually, RTP is used to exchange the media (audio, voice or data) during the communication session, but SIP allows any transport protocol to be used.

Also, SIP messages (signaling) usually pass through some of the same equipment as the media to be exchanged during a communication session. However, it is important to maintain a logical separation between SIP signaling and the communication of the media (the session data) because the SIP signaling for a communication session might pass through one or more proxy servers while the media stream uses a more direct path between the participants in the communication session.

Still referring to FIG. 6, because of the services provided by the IMS included in the CN PS domain, and as already indicated above, a personal computer/terminal equipment (PC/TE) coupled to the UMTS via a MT (mobile terminal) can communicate voice, video and data to another PC connected to the Internet. Preferably, the communication may be made to any entity supporting IMS, such as another mobile terminal. The PC/TE may communicate with the MT in any number of ways, such as using Bluetooth (BT) technology, for example. In such a communication, the PC/TE and the MT, so coupled in combination, make up what is called the user equipment (UE). In general, a UE device is an MT coupled to a terminal equipment (TE) device, such as but not necessarily restricted to, a PC. The UE device may be an IMS-enabled mobile phone, including a MT coupled to a TE device such as a specialized processor, wherein the specialized processor is not what is generally referred to as a PC. It should be realized that the above logical entities can be combined in a single physical device.

The RTP protocol comprises data part RTP packets and control part packets, such as RTCP (RTP Control Protocol) packets. The RTP packets contain media data. The RTCP packets contain control information, such as information for synchronizing the RTP media streams, user address information, and information on available data rate, etc.

In general, RTP and RTCP have different characteristics in terms of bandwidth requirement, packet size and delay requirements. Typically, for a VoIP service, the RTP packets comprise short packets (e.g. several tens of octets) that are sent regularly (e.g. every 20 msec), but need to be delivered quickly. The RTCP packets are sent rarely (e.g. every 5 sec) and can tolerate higher delays, but have a much bigger size (e.g. several hundreds of octets).

The RTP protocol is a protocol that normally uses an IP (Internet Protocol) and a UDP (User Datagram Protocol) as a transport protocol. Referring to FIG. 7, a UDP packet is used to transport the RTP/RTCP packets, wherein a UDP header provides a port number. Each media stream uses one UDP port number for RTP and one UDP port number for RTCP. However, the port number cannot be used to know whether the UDP packet contains an RTP or RTCP packet because any port number can be assigned to the stream carrying the RTP or RTCP packet. Moreover, the information is currently not provided to the RNC or AS (Access Stratum) of the UE.

The IP header is used to route the packet through the Internet from the source address to the destination address. The IP header also allows segmentation. The IP header contains information regarding the type of the included packet, i.e. whether a UDP packet or a different type of packet is included.

Therefore, what is needed is a method for distinguishing between RTP packets and RTCP packets included in the UDP packet.

SUMMARY OF THE INVENTION

The present invention is directed to distinguishing between protocol packets in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for distinguishing between protocol packets in a transmitting side of a wireless communication system, the method comprising receiving an IP packet comprising a UDP header and a second header located after the UDP header, the second header related to one of a RTP packet and a RTCP packet, checking the second header for a value, determining whether the second header is related to the RTP packet or the RTCP packet based on the value, and assigning a different quality of service for each of at least one of the RTP packet and the RTCP packet according to the determination.

Preferably, the value is a payload type field value, wherein the payload type field value comprises a value of the least significant bits of the payload type field.

In one aspect of the invention, the determining step comprises checking whether bits 9 through 15 of the payload type field of the second header correspond to a certain value, determining that the second header is related to the RTCP packet if the certain value is obtained, and determining that the second header is related to the RTP packet if the certain value is not obtained. Preferably, the certain value is one of 72 and 73.

In another aspect of the invention, the RTP packet and the RTCP packet are transmitted to a receiving side with the different quality of service. The method further comprises configuring a radio bearer for each of the at least one of the RTP packet and the RTCP packet according to the determination. Moreover, the RTP packet and the RTCP packet are transmitted to a receiving side on different radio bearers. Preferably, a core network (SGSN) distinguishes the IP packet as the RTP packet and the RTCP packet, wherein the core network is a serving general packet radio service support node (SGSN). Alternatively, a radio network controller (RNC) distinguishes the IP packet as the RTP packet and the RTCP packet.

In a further aspect of the invention, radio bearer information regarding the transmission on different radio bearers is transmitted to the receiving side, wherein the radio bearer information is transmitted via dedicated signaling.

In one aspect of the invention, the radio bearer carrying the RTCP packet has a lower priority than the radio barrier carrying the RTP packet, wherein the priority information is transmitted to the receiving side and the priority information is transmitted via dedicated signaling.

In another aspect of the invention, a non-access stratum (NAS) layer of a mobile terminal distinguishes the IP packet as the RTP packet and the RTCP packet.

In another embodiment of the present invention, an apparatus for distinguishing between protocol packets in a transmitting side of a wireless communication system comprises means for receiving an IP packet comprising a UDP header and a second header located after the UDP header, the second header related to one of a RTP packet and a RTCP packet, means for checking the second header for a value, means for determining whether the second header is related to the RTP packet or the RTCP packet based on the value, and means for assigning a different quality of service for each of at least one of the RTP packet and the RTCP packet according to the determination.

Preferably, the value is a payload type field value, wherein the payload type field value comprises a value of the least significant bits of the payload type field.

In one aspect of the invention, the means for determining whether the second header comprises the RTP packet or the RTCP packet based on the value comprises means for checking whether bits 9 through 15 of the payload type field of the second header correspond to a certain value, means for determining that the second header is related to the RTCP packet if the certain value is obtained, and means for determining that the second header is related to the RTP packet if the certain value is not obtained. Preferably, the certain value is one of 72 and 73.

In another aspect of the invention, the RTP packet and the RTCP packet are transmitted to a receiving side with the different quality of service. The apparatus further comprises means for configuring a radio bearer for each of the at least one of the RTP packet and the RTCP packet according to the determination. Moreover, the RTP packet and the RTCP packet are transmitted to a receiving side on different radio bearers. Preferably, a core network (SGSN) distinguishes the IP packet as the RTP packet and the RTCP packet, wherein the core network is a serving general packet radio service support node (SGSN). Alternatively, a radio network controller (RNC) distinguishes the IP packet as the RTP packet and the RTCP packet.

In a further aspect of the invention, radio bearer information regarding the transmission on different radio bearers is transmitted to the receiving side, wherein the radio bearer information is transmitted via dedicated signaling.

In one aspect of the invention, the radio bearer carrying the RTCP packet has a lower priority than the radio barrier carrying the RTP packet, wherein the priority information is transmitted to the receiving side and the priority information is transmitted via dedicated signaling.

In another aspect of the invention, a non-access stratum (NAS) layer of a mobile terminal distinguishes the IP packet as the RTP packet and the RTCP packet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 8 illustrates an RTP header format in accordance with one embodiment of the present invention.

FIG. 9 illustrates a sender report (SR) header format in accordance with one embodiment of the present invention.

FIG. 10 illustrates a receiver report (RR) header format in accordance with one embodiment of the present invention.

DETAILED DESCRIPTION OF THE PREFERRED EMBODIMENTS

Figure 1:
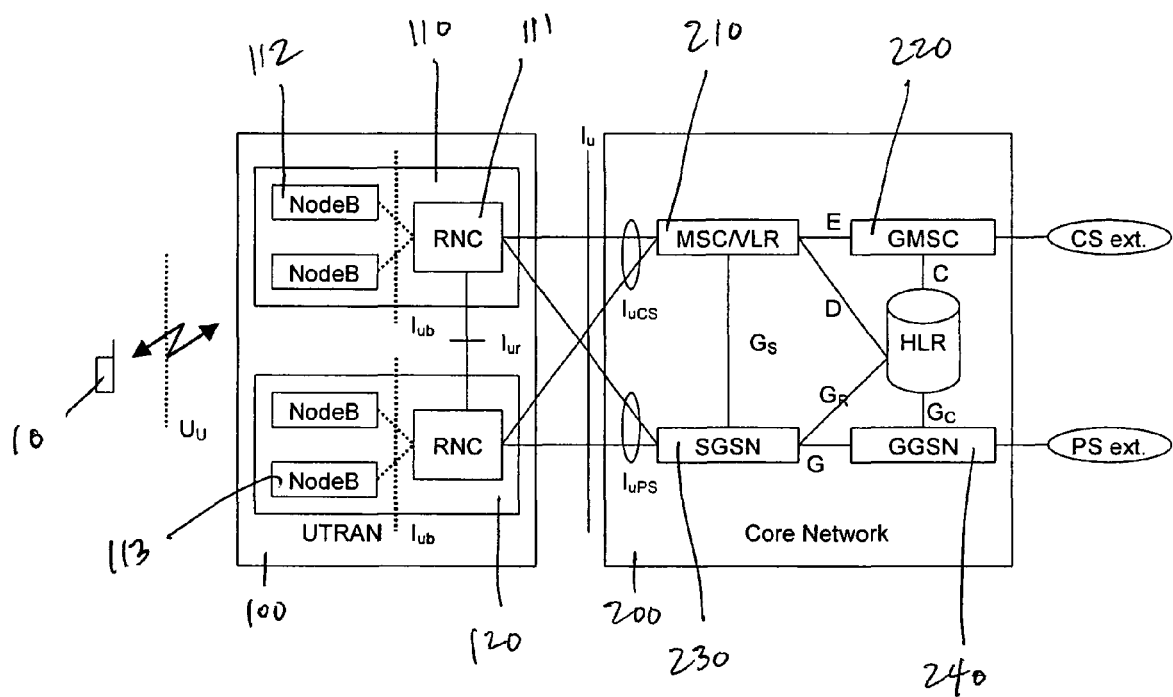
FIG. 1 is a block diagram of a general UMTS network architecture.
Figure 2:
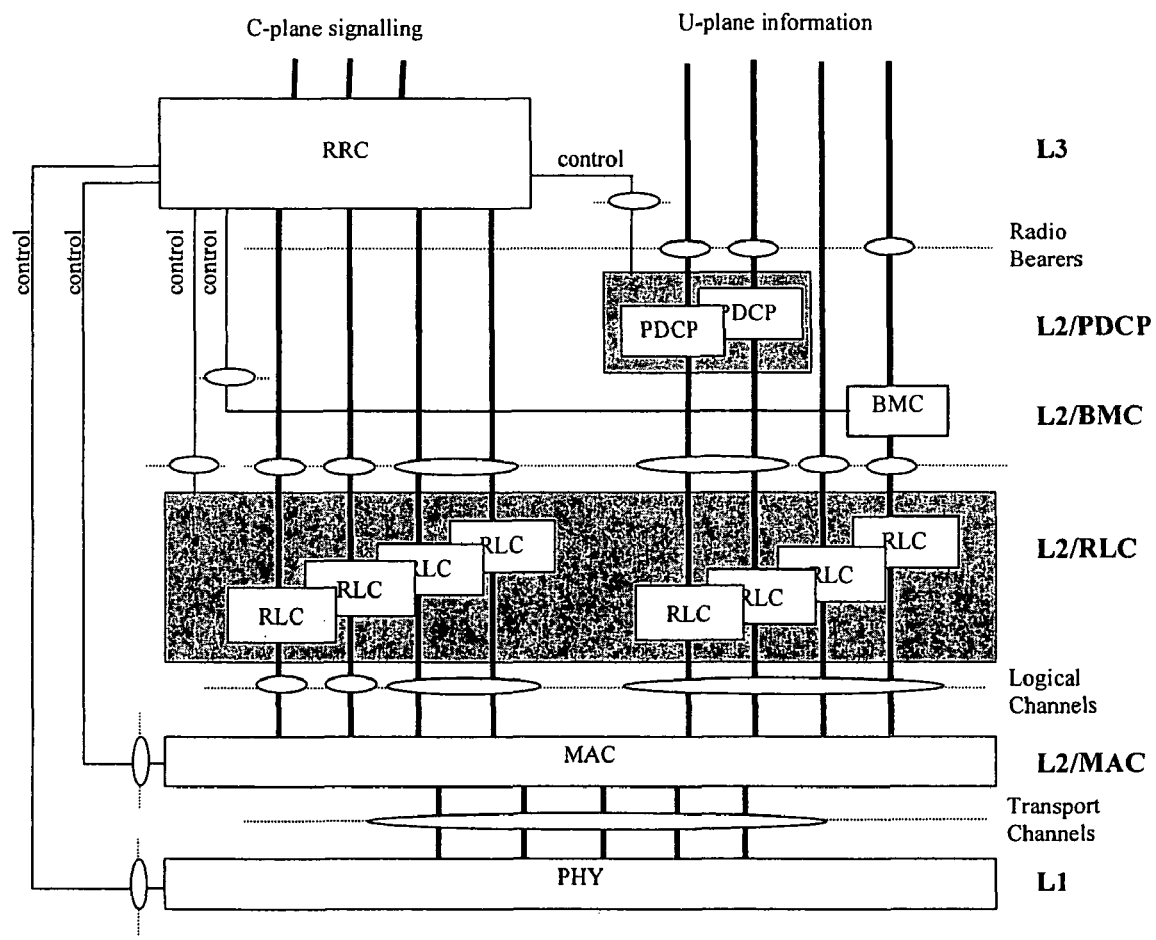
FIG. 2 is a block diagram of a structure of a radio interface protocol between a terminal and a network based on 3GPP radio access network standards.
Figure 3:
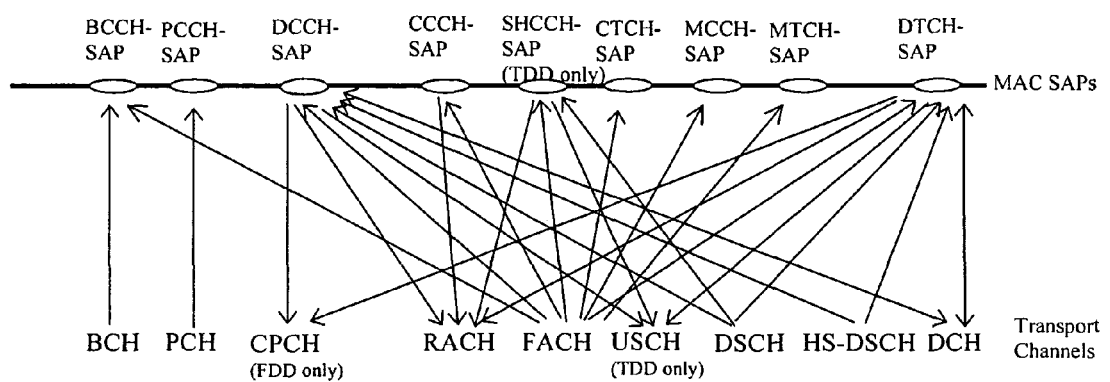
FIG. 3 illustrates the mapping of logical channels onto transport channels in the mobile terminal.
Figure 4:
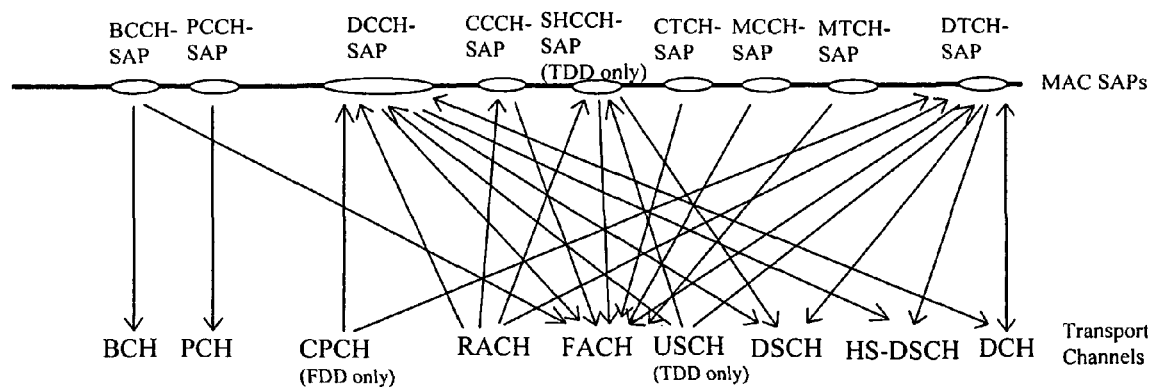
FIG. 4 illustrates the mapping of logical channels onto transport channels in the network.
Figure 5:
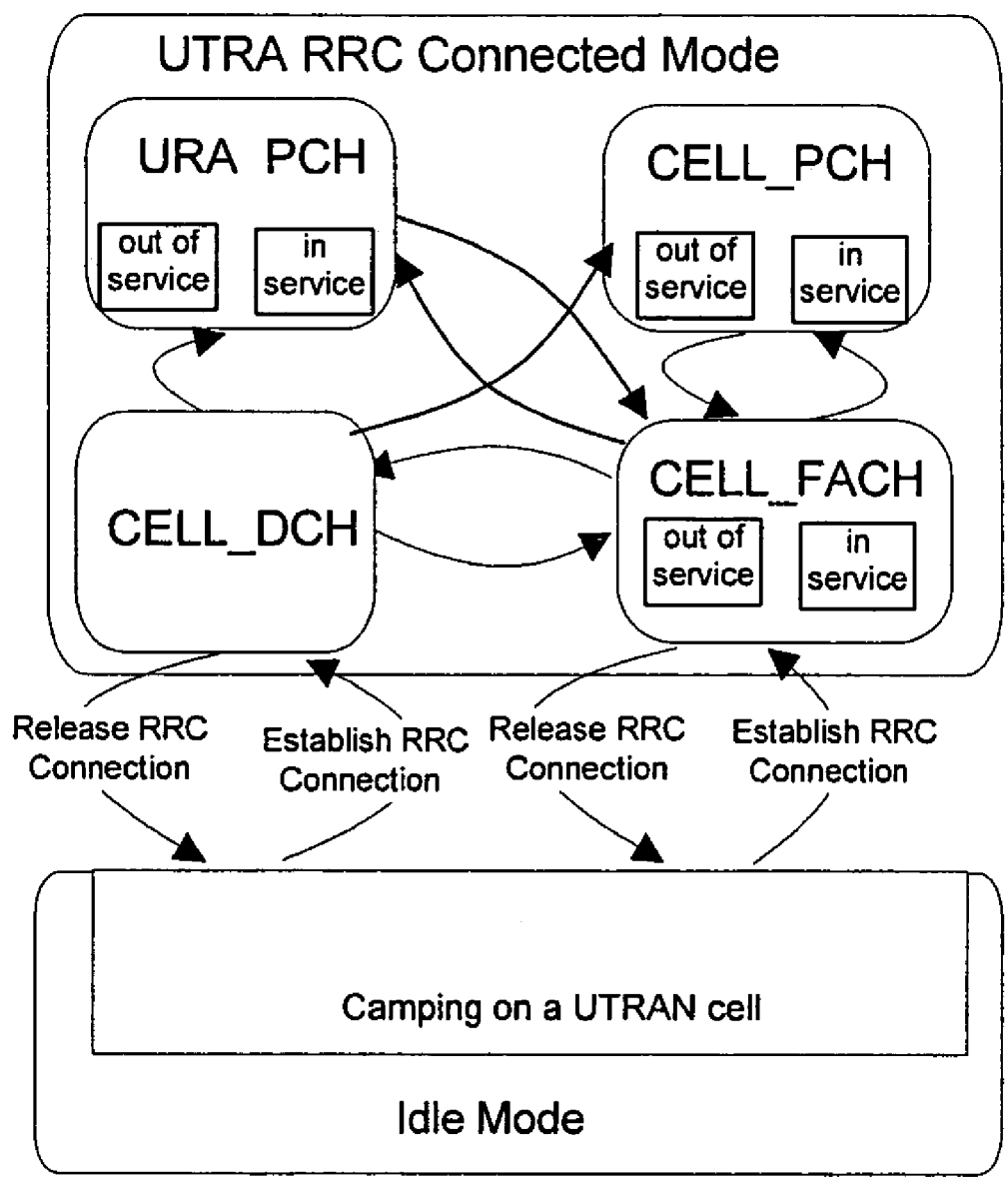
FIG. 5 illustrates possible transitions between modes and states in the UMTS network.
Figure 6:
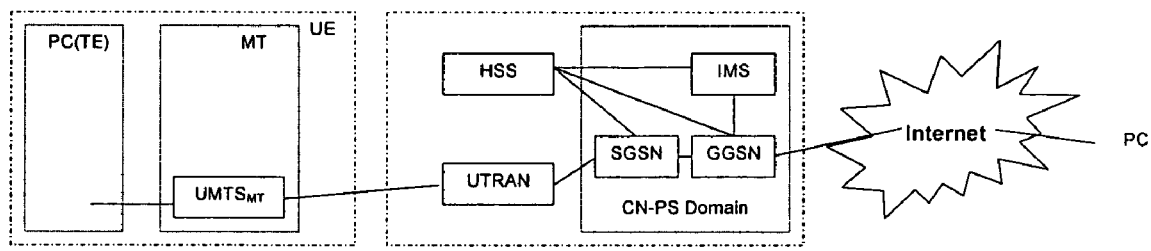
FIG. 6 illustrates an Internet Protocol Multimedia Subsystem (IMS) architecture.
Figure 7:
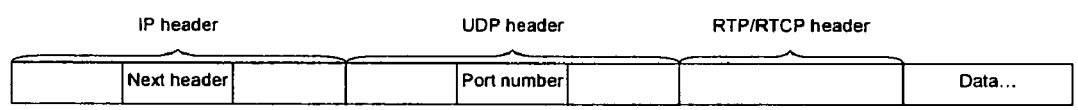
FIG. 7 illustrates headers for transporting protocol packets in accordance with one embodiment of the present invention.

The present invention relates to distinguishing between an RTP packet and an RTCP packet in a wireless communication system.

In accordance with one embodiment of the present invention, a radio network controller (RNC)/access stratum (AS) in the UE can identify whether a header, placed after the UDP header, contains RTP or RTCP packets. The RNC/AS makes the identification using information, such as information regarding a quality of service, with which data is sent. Specifically, when a "conversational" or "streaming" quality of service is used for a radio access bearer (RAB) of a packet-switched (PS) domain, the RAB normally uses the RTP/RTCP protocol.

An RTP protocol specifies RTP and RTCP packets. Referring to FIG. 8, an RTP packet header format is shown. The RTP header includes a marker M (bit 8) and a payload type field depicted as a PT field (bits 9-15). Preferably, the values 72 and 73 for the PT field are reserved (not used) to help distinguish RTP packets from RTCP packets in accordance with the present invention.

A RTCP packet comprises a list of different types of packets. The different types of packets are: 1) a sender report (SR) for transmitting and receiving statistics from participants that are active senders; 2) a receiver report (RR) for receiving statistics from participants that are not active senders and in combination with an SR for active senders reporting on more than 31 sources; 3) source description items (SDES), including CNAME; 4) BYE for indicating and end of participation; and 5) APP for application-specific functions. Preferably, the RTCP packet begins with either an SR or an RR.

In order to distinguish the RTP packets from the RTCP packets, a payload type field (PT field) of the RTCP header is used. Referring to FIG. 9, a format for the SR is illustrated. In FIG. 9, the PT field has a fixed value of 200. Referring to FIG. 10, a format for the RR is illustrated. In FIG. 10, the PT field has a fixed value of 201. Accordingly, in the RTCP packet, a first payload type field PT in the header (bits 8-15) always has the value 200 (SR) or 201 (RR). The corresponding field of the RTP packet corresponds to the marker M (bit 8) and the payload type PT field (bits 9-15) of the RTP header.

As mentioned above, use of the values 72 and 73 for the PT field (bits 9 through 15) of the RTP header is not allowed. Moreover, the values 200 and 201 for the PT field of the RTCP header are equivalent to the values 72 and 73. Thus, the RTP and RTCP header may be distinguished. Therefore, it is sufficient to check whether bits 9 through 15 of an RTP/RTCP packet correspond to the value 72/73 to verify whether the packet is an RTP packet or an RTCP packet.

Specifically, bits 9 through 15 in the RR/SR header correspond to the seven least significant bits of the PT field of the RR/SR header. For the RR/SR packets, this corresponds to the seven least significant bits of the PT field of the RR/SR packet. The PT fields of the SR header and the RR header have fixed values of 200 and 201, respectively. When only the seven least significant bits (LSB) are regarded, the values 72 and 73 are given for the PT field of the RR/SR header. As aforementioned, the values 72 and 73 are not used for the PT field of the RTP header. Therefore, by checking when the decimal value of the bits 9 through 15 after the UDP header of a stream carrying either RTP or RTCP gives the value 72 or 73, the packet may be distinguished as an RTCP packet.

Figure 11:
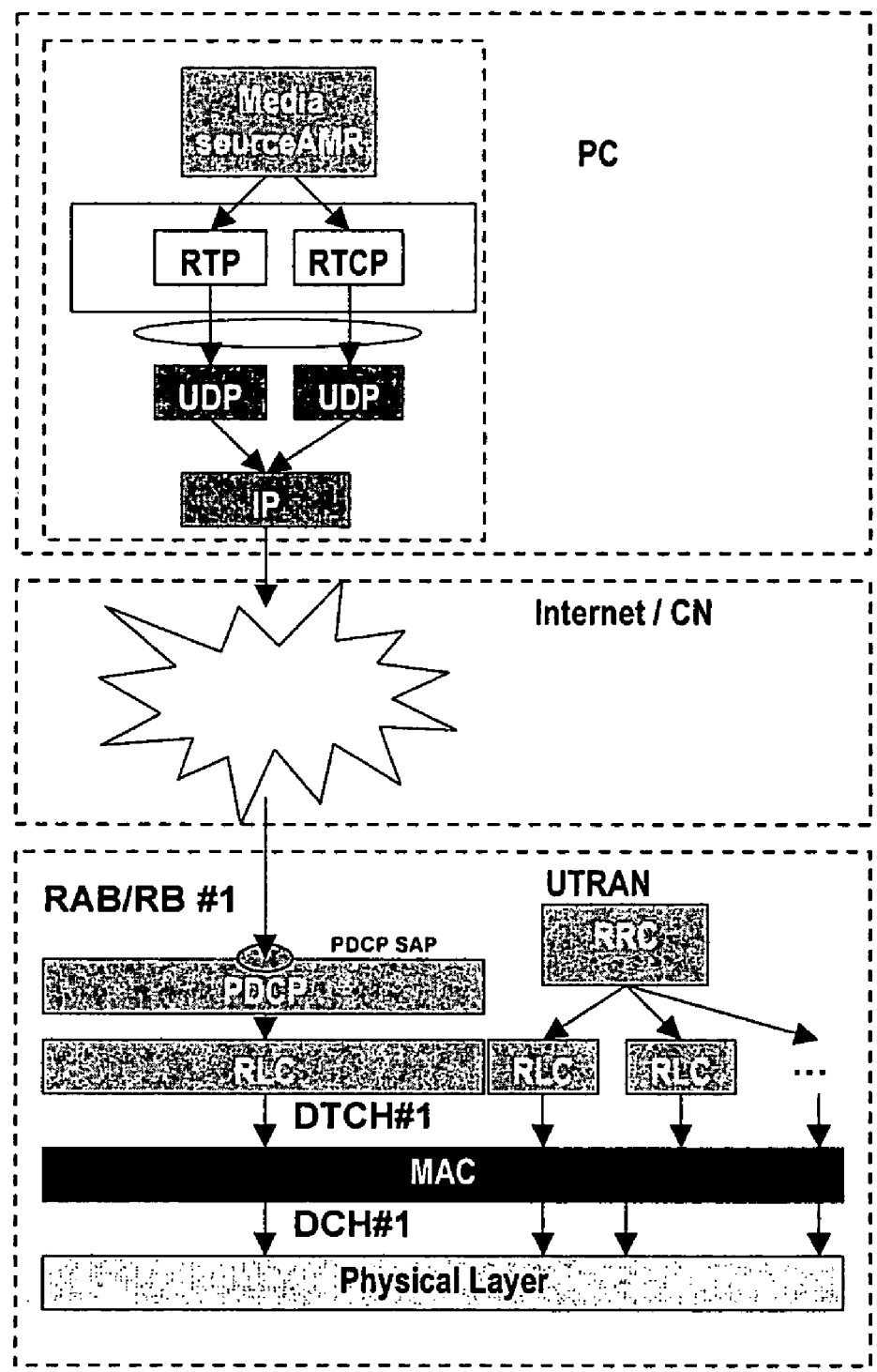
FIG. 11 illustrates mapping of a multimedia stream in accordance with one embodiment of the present invention.

Referring to FIG. 11, mapping of a multimedia stream in the downlink is shown. In a PC or any type of terminal or system, a media source generates a stream containing RTP and RTCP packets that are encapsulated in UDP/IP packets. The RTP/RTCP packets use different UDP port numbers but the same IP address. These packets are then transported via the Internet to a GGSN of a core network (CN). The GGSN transmits these packets to the SGSN. The SGSN then transmits the UDP/IP packets in one RAB context to the RNC. In the RNC, the IP packets are sent all together in one RB context, and are eventually compressed using header compression algorithms, in the PDCP entity. The RLC entity operating in TM, UM or AM mode provides functions such as concatenation and segmentation depending on the RLC mode. Preferably, the UM mode, or as an alternative the AM mode, is used in order to use the segmentation and concatenation function. Since all packets are sent through the same radio bearer, the IP packets received via the RAB are sent over the physical layer in the same order.

In the downlink, the data rate is changed very slowly. Moreover, the total sum of the data rate available is limited by the downlink codes available. Thus, it is important that each UE use only the minimum data rate necessary.

Figure 12:
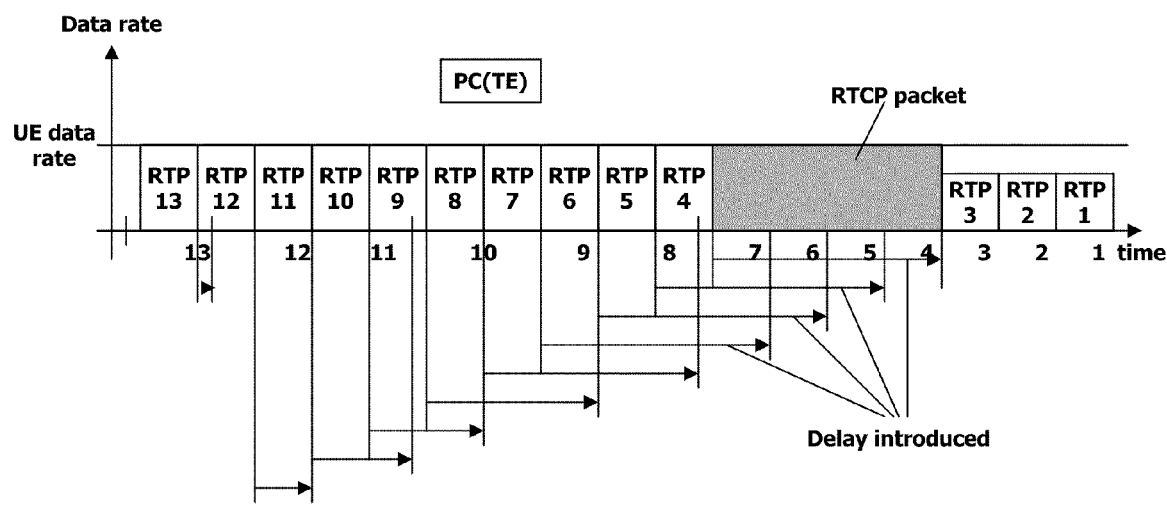
FIG. 12 illustrates a delay while transmitting protocol packets in accordance with one embodiment of the present invention.

Referring to FIG. 12, delay induced when a RTCP packet is transmitted is illustrated. Because the IP packets are transmitted in sequence and the RTCP packet is very large, the RTP packets that are normally transmitted will be delayed due to the transmission of the RTCP packet. Only when the transmission of the RTCP packet is completed, can the RTP packets, which have been buffered, be transmitted. If the UE data rate is higher than the data rate normally used for transmitting the RTP packets, then the delay will decrease slowly. According to other realizations, the RTP packets that have not been transmitted due to the transmission of the RTCP packet may be dropped. Alternatively, if the transmission of the RTP packets takes too much time, then the RTCP packet transmission may be stopped. In another realization, a period where no RTP packets are transmitted is found in order to transmit the RTCP packet.

Figure 13:
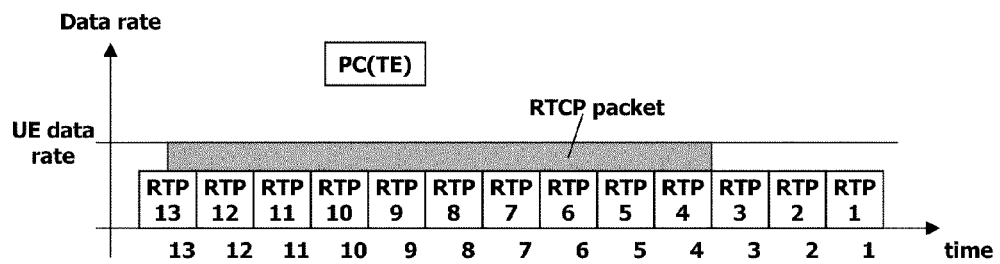
FIG. 13 illustrates parallel transmission of protocol packets in accordance with one embodiment of the present invention.

In accordance with one embodiment of the present invention, an enhanced scheme transmits RTP and RTCP packets on separate radio bearers or separate flows in order to transport the packets with a different quality of service. The enhanced scheme allows the transmission of RTP packets to be given higher priority while the RTCP packets are sent in parallel on a different transport channel or on the same transport channel, but with a lower priority. Referring to FIG. 13, a parallel transmission of RTCP packets is shown.

In order to use the enhanced scheme, the RTCP packet must be segmented, e.g. using the RLC UM/AM mode. In the MAC layer, the different logical channels can have different priorities. In order to privilege the RTP packets, the logical channel that maps the radio bearer carrying RTP on the transport channel must have higher priority. The MAC algorithm that chooses the transport format combination can then be used to privilege the RTP packets.

Figure 14:
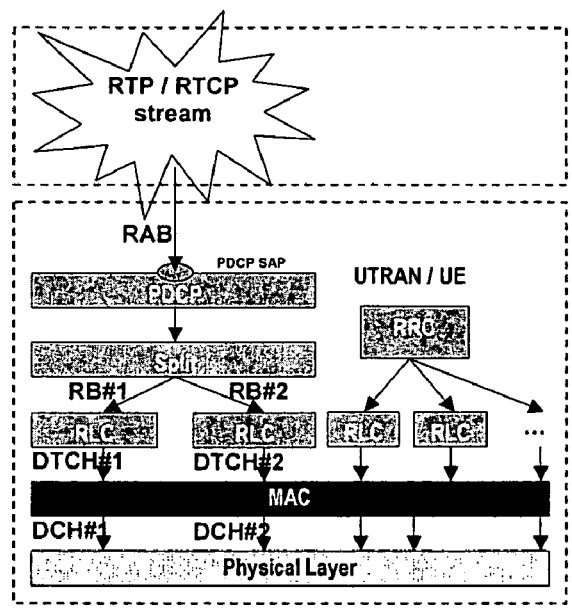
FIG. 14 illustrates a first method of dividing a data stream in accordance with one embodiment of the present invention.
Figure 15:
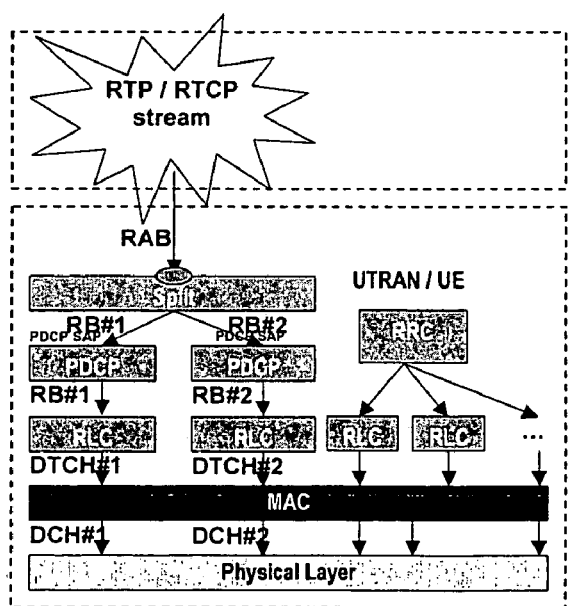
FIG. 15 illustrates a second method of dividing a data stream in accordance with one embodiment of the present invention.
Figure 16:
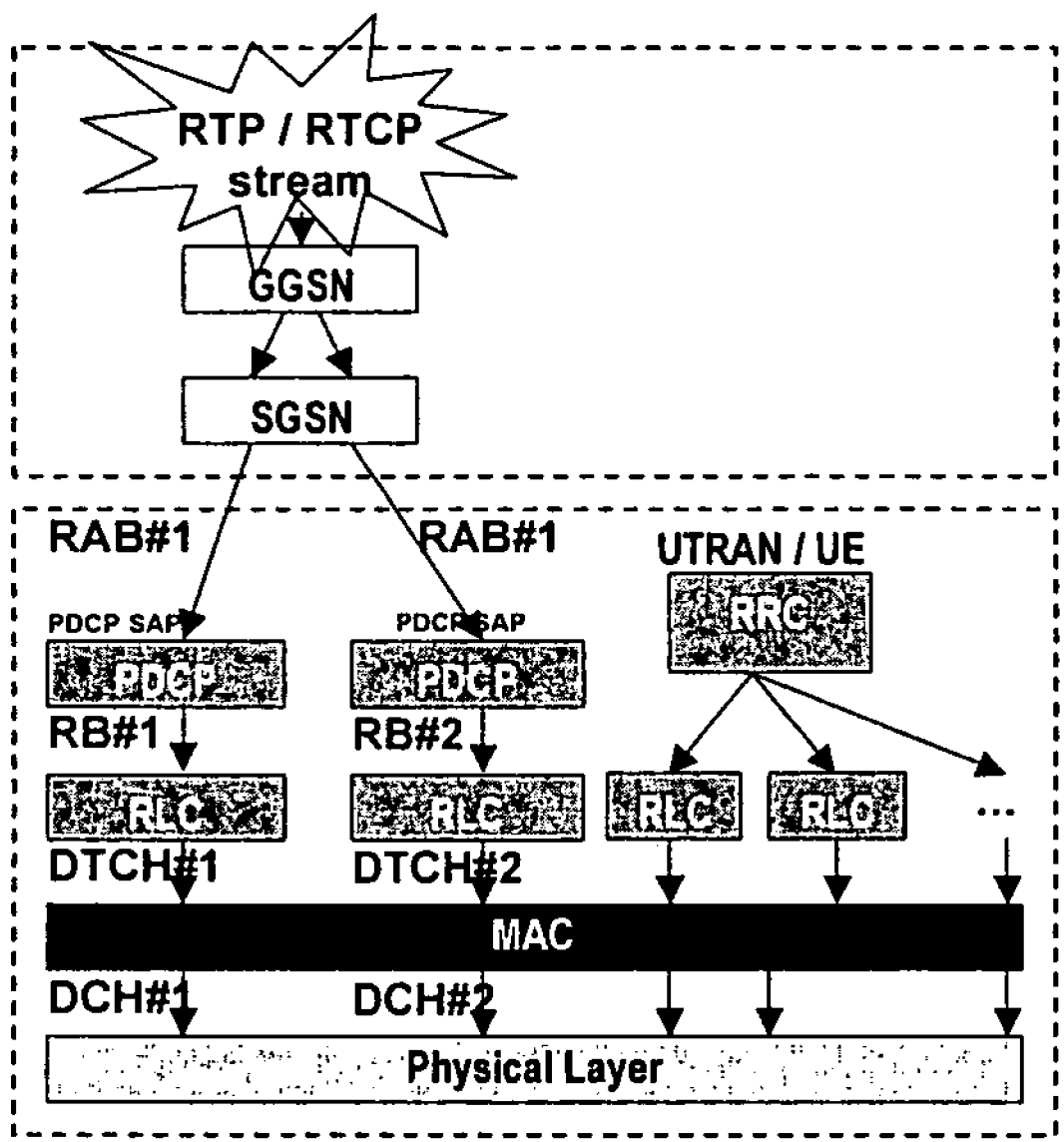
FIG. 16 illustrates a third method of dividing a data stream in accordance with one embodiment of the present invention.

Referring to FIGS. 14, 15 and 16, possible realizations for an entity that splits the parts of the stream are shown. Possible entities are the SGSN, the RNC above the PDCP entity and the RNC below the PDCP entity. In another implementation, the splitting function may be mixed with the PDCP layer.

Problems can arise from the fact that the RTP and RTCP packets have different characteristics, and therefore should be transported with a different QoS attribute.

In the uplink, the UE data rate can be changed in a more dynamic way. Thus, in principle, the maximum data rate does not necessarily have to be limited. However, in the MAC layer, a functionality exists that allows the data rate to be limited when the uplink power used by the UE is limited. If the UE is in such a case, the split of the RTP and RTCP would be beneficial to ensure the uplink transmission of RTP is not interrupted by the RTCP packets.

As described above, the present invention checks the bits 9 through 15 after the UDP header of an IP packet to determine whether the packet is a RTP or RTCP packet and then transports these packets with a different quality of service.

The packets in the UMTS system in the downlink can be split such that in the UTRAN/UE, the packets are mapped on different radio bearers. This split may be done in the downlink in the GGSN, which means separate PDP contexts would be required. The split may also be done in the RNC above or below the PDCP layer.

In the uplink, the split may be done in the NAS layer of the UE, which means separate PDP contexts would be needed. The split in the uplink may also be done above or below the PDCP layer.

Information regarding whether the RTP/RTCP packets are to be transmitted on separate radio bearers and which priorities are supposed to be used needs to be signaled to the UE. This can be signaled using dedicated signaling. Preferably, the UE is informed that the RAB needs to be split into two different radio bearers. Moreover, the UE is informed at radio bearer (RB) setup, which RB will carry the RTP or the RTCP packets that are sent in the data stream. This is easily feasible in the UMTS standard, either in a new release of the standard, or by adding extensions to the messages.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for distinguishing between protocol packets in a transmitting side of a wireless communication system, the method comprising:
   receiving an Internet Protocol (IP) packet comprising a User Datagram Protocol (UDP) header and a second header located after the UDP header, the second header related to one of a Real-Time Protocol (RTP) packet and a RTP Control Protocol (RTCP) packet;
   checking whether bits 9 through 15 of a payload type field of the second header correspond to a certain value;
   determining whether the second header is related to the RTP packet or the RTCP packet based on the certain value; and
   assigning a different quality of service for each of at least one of the RTP packet and the RTCP packet according to the determination,
   wherein the RTP packet and the RTCP packet are transmitted to a receiving side on different radio bearers, and a radio bearer carrying the RTCP packet has a lower priority than a radio bearer carrying the RTP packet.

2. The method of claim 1, wherein the certain value corresponds to a value of the least significant bits of the payload type field.

3. The method of claim 1, wherein the determining step further comprises:
   determining that the second header is related to the RTCP packet if the certain value is obtained; and
   determining that the second header is related to the RTP packet if the certain value is not obtained.

4. The method of claim 3, wherein the certain value is one of 72 and 73.

5. The method of claim 1, wherein the RTP packet and the RTCP packet are transmitted to a receiving side with the different quality of service.

6. The method of claim 1, further comprising configuring a radio bearer for each of the at least one of the RTP packet and the RTCP packet according to the determination.

7. The method of claim 1, wherein a core network distinguishes the IP packet as the RTP packet or the RTCP packet.

8. The method of claim 7, wherein the core network is a serving general packet radio service support node (SGSN).

9. The method of claim 1, wherein a radio network controller (RNC) distinguishes the IP packet as the RTP packet or the RTCP packet.

10. The method of claim 1, wherein radio bearer information regarding the transmission on different radio bearers is transmitted to the receiving side.

11. The method of claim 10, wherein the radio bearer information is transmitted via dedicated signaling.

12. The method of claim 1, wherein priority information is transmitted to the receiving side.

13. The method of claim 12, wherein the priority information is transmitted via dedicated signaling.

14. The method of claim 1, wherein a non-access stratum (NAS) layer of a mobile terminal distinguishes the IP packet as the RTP packet or the RTCP packet.

15. An apparatus for distinguishing between protocol packets in a transmitting side of a wireless communication system, the apparatus comprising:
   means for receiving an IP packet comprising a UDP header and a second header located after the UDP header, the second header related to one of a RTP packet and a RTCP packet;
   means for checking whether bits 9 through 15 of a payload type field of the second header corresponds to a certain value;
   means for determining whether the second header is related to the RTP packet or the RTCP packet based on the certain value; and
   means for assigning a different quality of service for each of at least one of the RTP packet and the RTCP packet according to the determination,
   wherein the RTP packet and the RTCP packet are transmitted to a receiving side on different radio bearers, and a radio bearer carrying the RTCP packet has a lower priority than a radio bearer carrying the RTP packet.

16. The apparatus of claim 15, wherein the certain value corresponds to a value of the least significant bits of the payload type field.

17. The apparatus of claim 15, wherein the means for determining whether the second header is related to the RTP packet or the RTCP packet based on the value further comprises:
   means for determining that the second header is related to the RTCP packet if the certain value is obtained; and
   means for determining that the second header is related to the RTP packet if the certain value is not obtained.

18. The apparatus of claim 17, wherein the certain value is one of 72 and 73.

19. The apparatus of claim 15, wherein the RTP packet and the RTCP packet are transmitted to a receiving side with the different quality of service.

20. The apparatus of claim 19, further comprising means for configuring a radio bearer for each of the at least one of the RTP packet and the RTCP packet according to the determination.

21. The apparatus of claim 15, wherein a core network distinguishes the IP packet as the RTP packet or the RTCP packet.

22. The apparatus of claim 21, wherein the core network is a serving general packet radio service support node (SGSN).

23. The apparatus of claim 15, wherein a radio network controller (RNC) distinguishes the IP packet as the RTP packet or the RTCP packet.

24. The apparatus of claim 15, wherein radio bearer information regarding the transmission on different radio bearers is transmitted to the receiving side.

25. The apparatus of claim 24, wherein the radio bearer information is transmitted via dedicated signaling.

26. The apparatus of claim 15, wherein priority information is transmitted to the receiving side.

27. The apparatus of claim 26, wherein the priority information is transmitted via dedicated signaling.

28. The apparatus of claim 15, wherein a non-access stratum (NAS) layer of a mobile terminal distinguishes the IP packet as the RTP packet or the RTCP packet.

* * * * *